United States Patent
Orlick et al.

(10) Patent No.: US 7,423,691 B2
(45) Date of Patent: Sep. 9, 2008

(54) METHOD OF LOW LATENCY INTERLACE TO PROGRESSIVE VIDEO FORMAT CONVERSION

(75) Inventors: Christopher J. Orlick, Newtown, PA (US); Scott Miller, East Greenville, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1390 days.

(21) Appl. No.: 09/988,924

(22) Filed: Nov. 19, 2001

(65) Prior Publication Data
US 2003/0095205 A1 May 22, 2003

(51) Int. Cl.
H04N 11/20 (2006.01)

(52) U.S. Cl. .................. 348/448; 348/441; 348/452; 348/458

(58) Field of Classification Search ................ 348/448, 348/452, 607, 441, 458; H04N 11/20
See application file for complete search history.

(56) References Cited

U.S. PATENT DOCUMENTS

| | | | |
|---|---|---|---|
| 4,731,648 A | 3/1988 | Bernard et al. | |
| 4,774,581 A | 9/1988 | Shiratsuchi | |
| 4,989,090 A * | 1/1991 | Campbell et al. | ........... 348/451 |
| 5,051,826 A | 9/1991 | Ishii et al. | |
| 5,280,350 A * | 1/1994 | DeHaan et al. | .............. 348/441 |
| 5,381,183 A | 1/1995 | Ishizuka et al. | |
| 5,483,288 A * | 1/1996 | Hong | ......................... 348/448 |
| 5,631,706 A | 5/1997 | Tsunashima | |
| 5,638,139 A | 6/1997 | Clatanoff et al. | |
| 5,786,862 A * | 7/1998 | Kim et al. | .................... 348/448 |
| 5,793,435 A | 8/1998 | Ward et al. | |
| 5,886,745 A | 3/1999 | Muraji et al. | |
| 5,936,676 A | 8/1999 | Ledinh et al. | |
| 5,943,099 A | 8/1999 | Kim | |
| 6,037,986 A | 3/2000 | Zhang et al. | |
| 6,055,018 A | 4/2000 | Swan | |
| 6,118,488 A * | 9/2000 | Huang | ........................ 348/452 |
| 6,181,382 B1 | 1/2001 | Kieu et al. | |
| 6,262,773 B1 * | 7/2001 | Westerman | ................. 348/448 |
| 6,295,091 B1 | 9/2001 | Huang | |
| 6,348,949 B1 * | 2/2002 | McVeigh | .................... 348/452 |

(Continued)

FOREIGN PATENT DOCUMENTS

EP          0 344 843 A1     5/1989

(Continued)

*Primary Examiner*—Trang U Tran
(74) *Attorney, Agent, or Firm*—RatnerPrestia

(57) ABSTRACT

The invention includes a method for converting from an interlace scan image to a progressive scan image. Interpolated rows of pixels, lying between successive rows of the interlace scan image, are generated based upon the received interlace scan rows. The method determines a degree of movement, if any, in the region of a target pixel, and whether a target pixel lies on an edge between visually distinct regions. Multiple potential interpolated values for the target pixel are generated by several interpolation methods, including edge interpolation, inter-field interpolation, non-linear interpolation, and intra-field interpolation. The system uses the degree of movement and edge detection to select or combine one or more of the potential values for the target pixel. At least one correction filter is applied to the result, to correct errors caused by electrical noise in the interlace scan image.

22 Claims, 11 Drawing Sheets

U.S. PATENT DOCUMENTS

| | | | | |
|---|---|---|---|---|
| 6,421,090 B1 * | 7/2002 | Jiang et al. | .................. | 348/452 |
| 6,545,719 B1 * | 4/2003 | Topper | ....................... | 348/448 |
| 6,577,345 B1 * | 6/2003 | Lim et al. | .................. | 348/452 |
| 6,731,342 B2 * | 5/2004 | Shin et al. | .................. | 348/452 |

FOREIGN PATENT DOCUMENTS

| | | |
|---|---|---|
| EP | 0 984 624 A2 | 3/2000 |
| JP | 02-0598988 | 2/1990 |
| JP | 2001-298714 | 10/2001 |

* cited by examiner

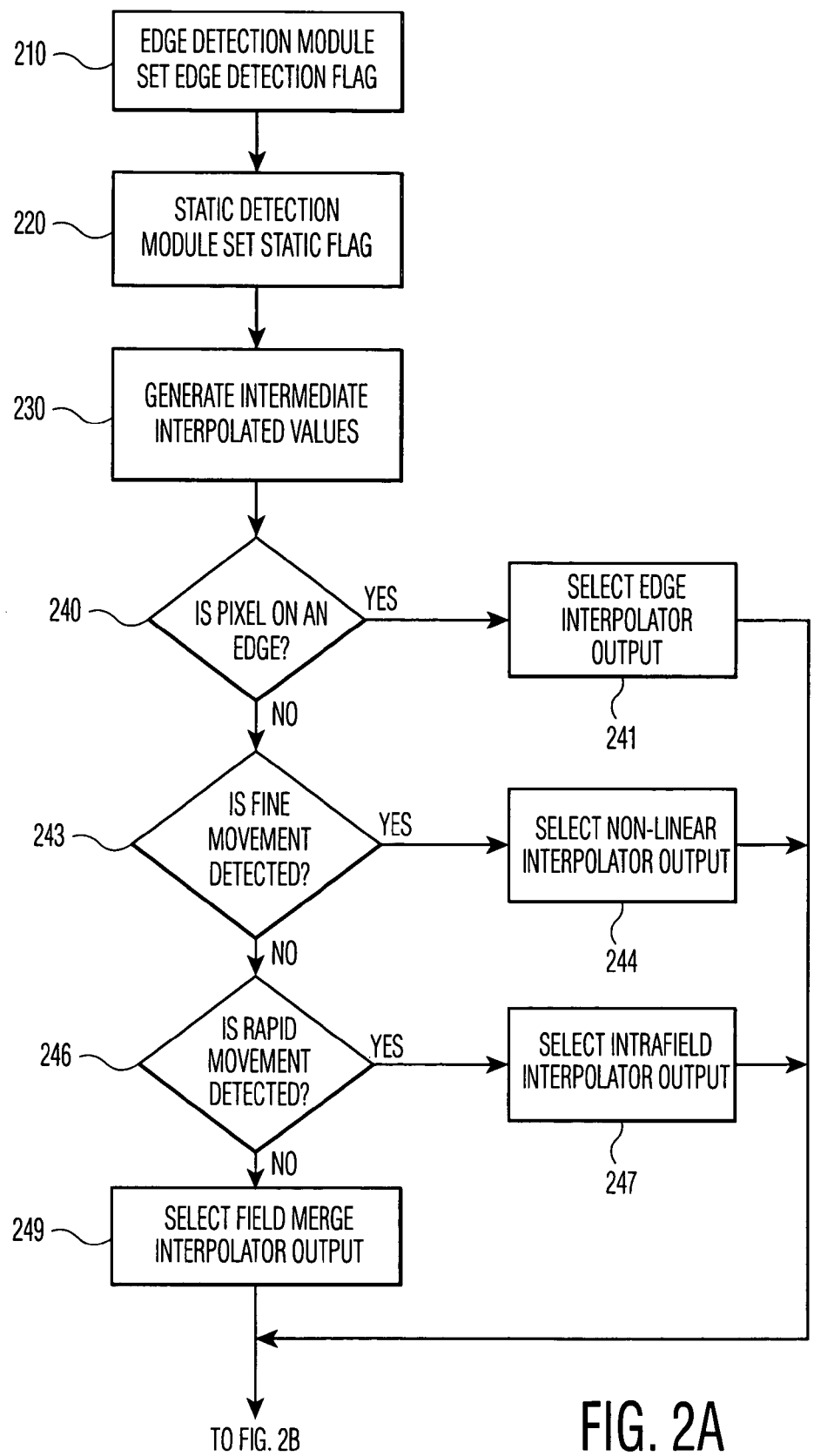

FIELD N

FIELD N-1

| | | | | | | 1 | 1 |
|---|---|---|---|---|---|---|---|
| | | | | 1 | 1 | 1 | |
| | | 1 | 1 | 1 | | | |
| 1 | 1 | 1 | | | | | |

FIG. 10A

| 1 | 1 | | | | | | |
|---|---|---|---|---|---|---|---|
| | 1 | 1 | 1 | | | | |
| | | | 1 | 1 | 1 | | |
| | | | | | 1 | 1 | 1 |

FIG. 10B

METHOD OF LOW LATENCY INTERLACE TO PROGRESSIVE VIDEO FORMAT CONVERSION

TECHNICAL FIELD

The present invention relates, in general, to interlace to progressive scan conversion systems and, more specifically, to a robust, low-latency method of converting an interlace scan system for a television image to a progressive scan system.

BACKGROUND OF THE INVENTION

The image on a television screen consists of picture elements (pixels), arranged horizontally in rows, generally offset vertically by one pixel position from one another. Each pixel is assigned a value which indicates, for a color image, the intensity of the red, green, or blue components of the pixel. A video image is generated by sequentially displaying the rows of pixels as horizontal lines of the image.

Existing analog broadcast standards such as NTSC, PAL and SECAM use two interlaced video fields to generate a single video frame. Each field includes one-half of the horizontal lines that make up the image frame. One field includes all of the odd numbered lines of the frame and the other field includes all of the even numbered lines. Interlaced images may exhibit distorting artifacts such as line flicker or loss of vertical detail that degrade the resulting frame image. One way to eliminate these artifacts is to convert the interlace-scanned fields into progressive-scan frames. In a progressive-scan frame, both the odd and even image lines are displayed concurrently as a single image.

Interlace-scan to progressive-scan conversion systems are gaining importance as more television viewers purchase high-definition television monitors that can display progressive-scan signals. Both broadcast facilities and consumers may want to have interlace-scan to progressive-scan conversion capability in order to avoid the distorting artifacts of interlace-scan images.

The simplest method of generating the interpolated pixel is simply duplicating the pixel from the corresponding position in the previously received scan line. For pixels which lie on an edge, this could result in "jaggies" (a line which appears to be jagged or stair-stepped, rather than smooth). For pixels which are not on an edge, such duplication could result in pixels that do not correspond to the image being displayed, resulting in a poor display to the viewer. This method also reduces the vertical resolution of the image compared to an interlace-scan image and may result in areas of the image flickering at a 30 Hz rate.

Another way to generate a progressive-scan frame from an interlace-scan field is to interpolate interstitial lines in each field. Thus, the lines of the odd field are used to interpolate even-numbered lines and the lines of the even field are used to interpolate odd-numbered lines. Each pixel of the interpolated line (i.e. each "interpolated pixel") is calculated based on the values of proximate pixels in adjacent interlace-scan lines. While this method tends to reduce the visibility of the jaggies, it also reduces the vertical resolution of the image, resulting in an undesirable blurring.

One problem with using interpolation occurs when the interpolated pixel is on the edge of two visually distinct regions. Interpolating such a pixel may result in a pixel that matches neither adjacent pixel. For example, the value generated for an interpolated pixel between a blue pixel and green pixel would be cyan, which would not result in the image desired to be presented to the viewer.

Another problem may occur when images of moving objects are displayed. If the interpolation method does not adequately compensate for the change in the presented image, then an interpolated pixel may appear to be uncoordinated with its surrounding pixels. For example, when a black dog in successive frames moves from left to right in front of a white wall, the left portion of the image which had displayed a black pixel must now display a white pixel, or the sense of movement may not be adequately conveyed to the viewer.

It would be desirable to implement this conversion with a minimum of processing time and overhead, and retain a high degree of accuracy in developing the desired visual image.

SUMMARY OF THE INVENTION

The present invention is embodied in a method for converting an interlace scan system for a television image to a progressive scan system by calculating in parallel several potential values for a target pixel, simultaneously determining the degree of movement, if any, in the region of the pixel as well as whether the pixel lies on an edge, combining the potential values with the determinations of edge position and relative movement to generate an intermediate value for the target pixel, and applying several filters to ensure that the output pixel is compatible with the displayed image.

An exemplary embodiment of the present invention implements this method by determining whether a target pixel of an interpolated row of pixels lies on an edge between visually distinct regions; determining the degree of movement in the region of the target pixel of the interpolated row of pixels between a last displayed image and a currently generated image; generating potential values for the target pixels utilizing various interpolation methods; selecting a value from the potential values for the target pixel based on said determination of whether said target pixel lies on an edge and said determination of degree of movement in the region of the target pixel; applying at least one predetermined filter to the value of the target pixel; and applying at least one predetermined filter to the interpolated row of pixels.

A feature of the present invention is a method for detecting fine movement in the region of the target pixel, and generating an output pixel that represents this fine movement in the displayed image.

Another feature of the present invention is the use of predetermined filters representing selected angles of edges, to efficiently determine whether an interpolated pixel lies on an edge of the image.

It is to be understood that both the foregoing general description and the following detailed description are exemplary, but are not restrictive, of the invention.

BRIEF DESCRIPTION OF THE DRAWINGS

FIGS. 10A and 10B are pixel diagrams that are useful for describing the edge correction filters utilized by the present invention.

DETAILED DESCRIPTION OF THE INVENTION

The present invention relates to a method of converting an interlace scan video signal into a progressive scan video signal, and specifically for generating picture elements (pixels) of interstitial lines in an interlaced field image by simultaneously calculating intermediate pixel values in parallel, utilizing various interpolation methods, and generating an output pixel value based on these intermediate values as well as various flags indicating the presence and degree of motion within the image to be displayed.

Figure 1:
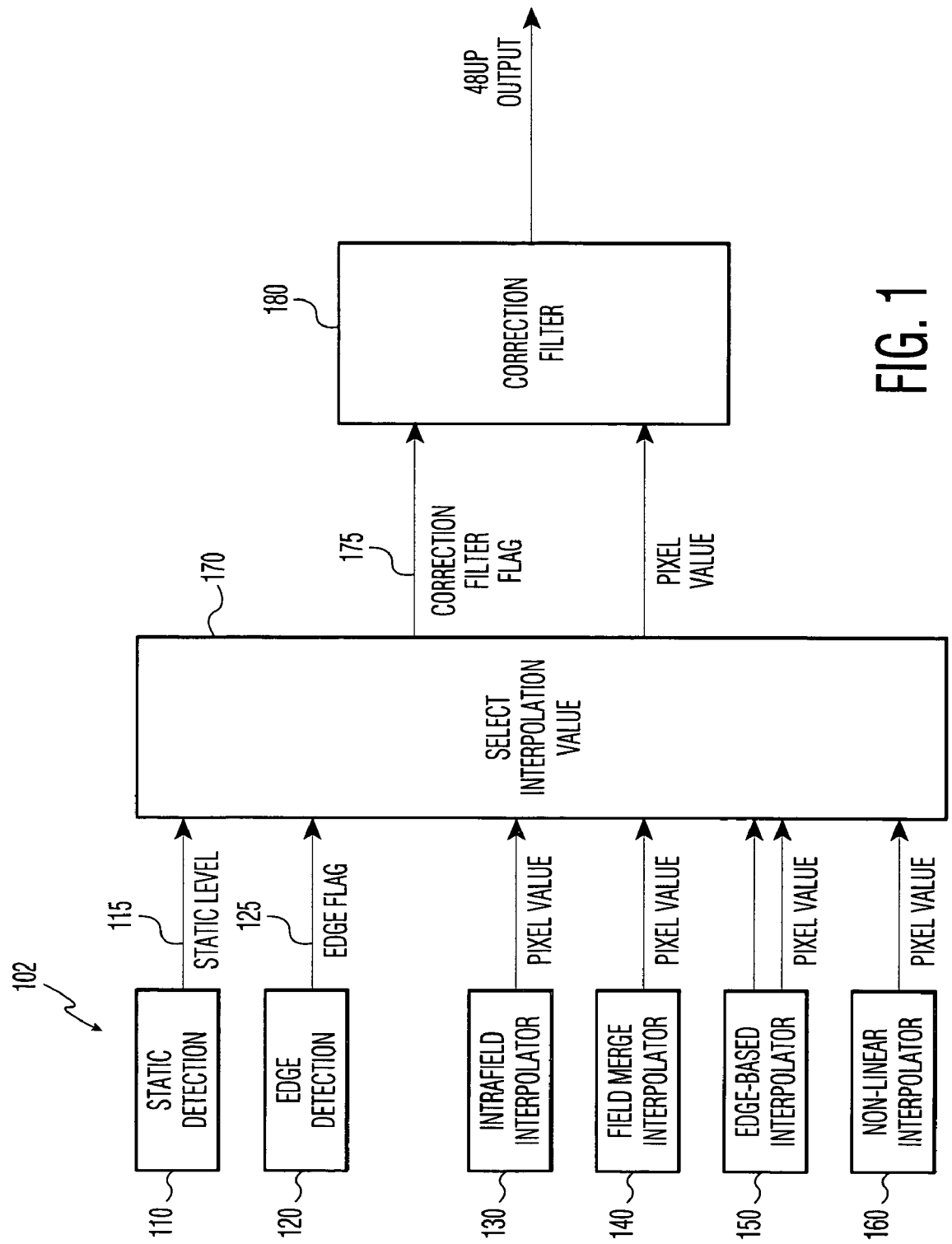
FIG. 1 is a block diagram of an embodiment of the system of the present invention.

FIG. 1, shows a system for converting an interlace scan system to a progressive scan system. This system works in successive stages, each of which processes the image in parallel. The stages are: an image processing stage 102, an interpolation selection stage 170 and a filtering stage 180. The image processing stage 102 includes a static detection block 110, an edge detection block 120, an intra-field interpolator 130, an optional field merge interpolator 140, an edge-based interpolator 150 and an optional non-linear interpolator 160. The field merge interpolator 140 and non-linear interpolator 160 are alternative elements of the system. In a practical system, only one of these devices is used. In the materials that follow, the field merge interpolator 140 and non-linear interpolator 160 are referred to generically as an inter-field interpolator.

The static detection block 110 determines, for each target pixel in the image, a degree of movement, if any, that has occurred between the successive fields and frames of the image to be displayed. The degree of motion is expressed as a three-bit static level value 115. The edge detection block 120 determines whether the target is pixel is on an edge between two visually distinct regions. The output signal of this block is an edge flag 125. The remaining blocks of the pixel processing stage 102 generate several intermediate values for the target pixel from various interpolation methods. As described below, these intermediate values are used in conjunction with static level 115 and edge flag 125 to generate an output value for the target pixel.

The selection stage 170 selects or blends one or more of these generated intermediate values to produce an output value for the target pixel, based on the values of static level 115 and edge flag 125, and sets flags to indicate what correction filters should be applied to the intermediate generated image. This stage uses deterministic rules to make these selections, avoiding computational overhead.

The filtering stage 180 uses flags set in the selection stage 170 to apply correction filters to the target pixel and adjacent pixels (including adjacent interpolated pixels) to detect and, if necessary, correct a value for the target pixel that may be an artifact of noise. The final value for the target pixel is generated by the filtering stage 180.

Motion Analysis and Edge Detection

Figure 3:
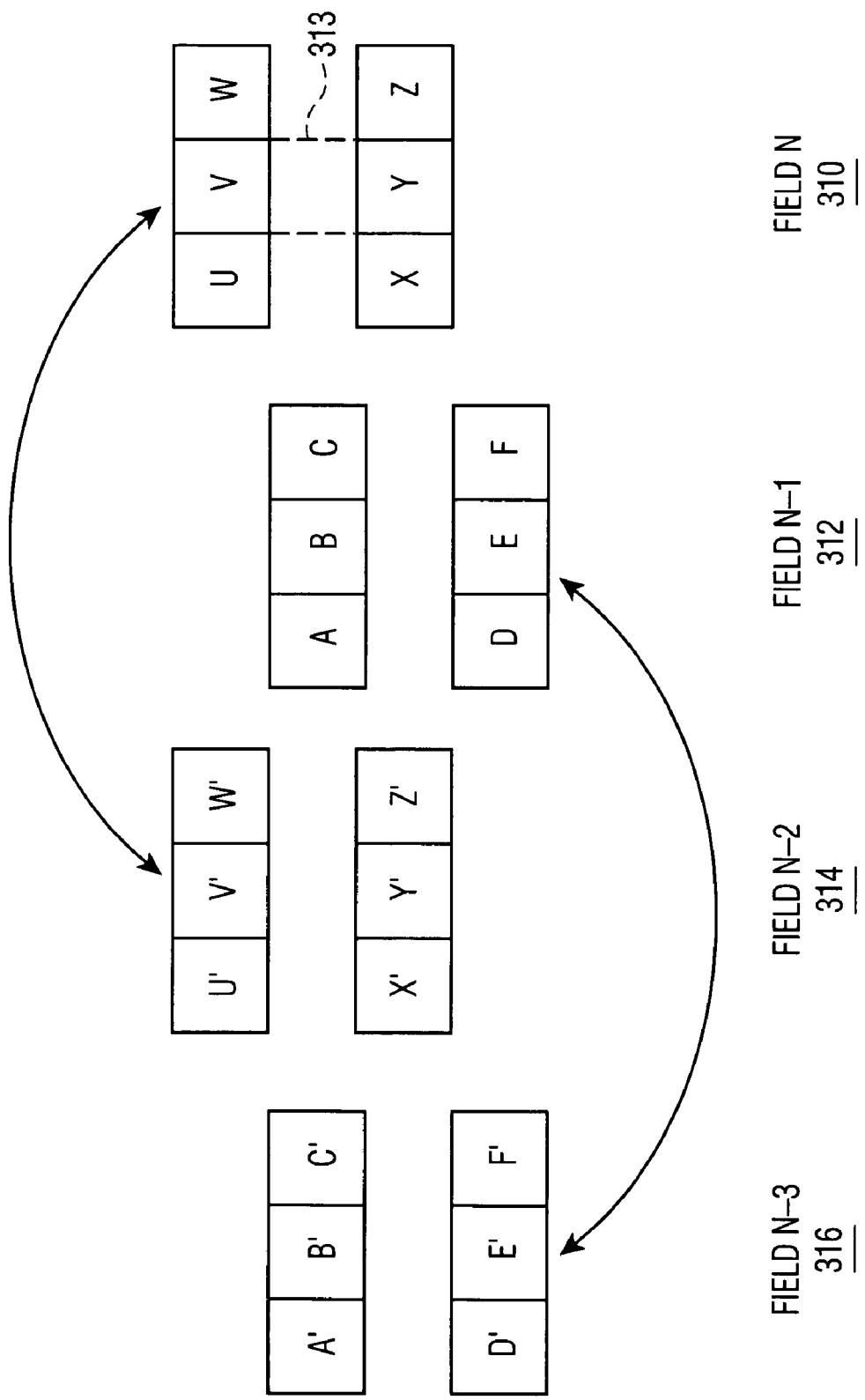
FIG. 3 is an image field diagram that depicts the static detection module of the present invention.

As shown in FIG. 3, static detector 110 operates by comparing spatially coincident pixels from the current frame (fields 310 and 312) to pixels from the previous frame (fields 314 and 316). Field N 310 contains the scanned rows having the pixels V and Y that are vertically adjacent to the target pixel 313. Field N-1 312 contains the target pixel, B, as it existed in the previous field and other pixels on the same line. Field N-2, 314, and Field N-3, 316, are the rows spatially coincident to Field N, 310, and Field N-1, 312, in the previously displayed image frame. The value of each pixel adjacent to the target pixel 313 and in rows vertically adjacent to the target pixel's row (i.e. pixels U, V, W, X, Y, Z), and the value of each pixel from prior field that are adjacent to the target pixel position (i.e. pixels A, B, C, D, E, F), are compared respectively with the values of spatially coincident pixels in the previous frame (U', V', W', X', Y', Z', and A', B', C', D', E', F'). The comparison is expressed as the absolute value of the difference of the values of the pixels being compared. In the example in FIG. 3, the differences shown in Table 1 are calculated:

TABLE 1

| |A-A'| | |D-D'| | |U-U'| | |X-X'| |
| |B-B'| | |E-E'| | |V-V'| | |Y-Y'| |
| |C-C'| | |F-F'| | |W-W'| | |Z-Z'| |

The largest difference magnitude is then compared with four predetermined threshold values, and the resulting value is stored in static level 115, as an output static level value between 0 and 4 inclusive. A static level value of 0 indicates that the maximum difference magnitude is less than all of the threshold values. A static level value of 1 indicates that the maximum difference value is greater than the first threshold value but less than all of the other threshold values, and so on for static level values of 2, 3 and 4. In the exemplary embodiment of the invention, the pixel values are ten-bit values between 0 and 1023. Exemplary motion threshold values for these pixels are 32, 38, 44 and 50.

Edge detector 120 operates by evaluating the pixel difference across a selected area of the image. A large difference, for example from black to white, indicates that an edge may be present. Various methods exist to detect an edge. The present invention may use, for example, the method disclosed in co-pending patent application "Method of Edge Based Interpolation" filed even date herewith. In the exemplary embodiment of the present invention, shown for example in FIGS. 4 and 5, a horizontal edge detector 410 and a vertical edge detector 420 determine a numeric value, called "edge strength," for the degree of change in the values of the pixels in the scanned rows adjacent to a target pixel.

Figure 4:
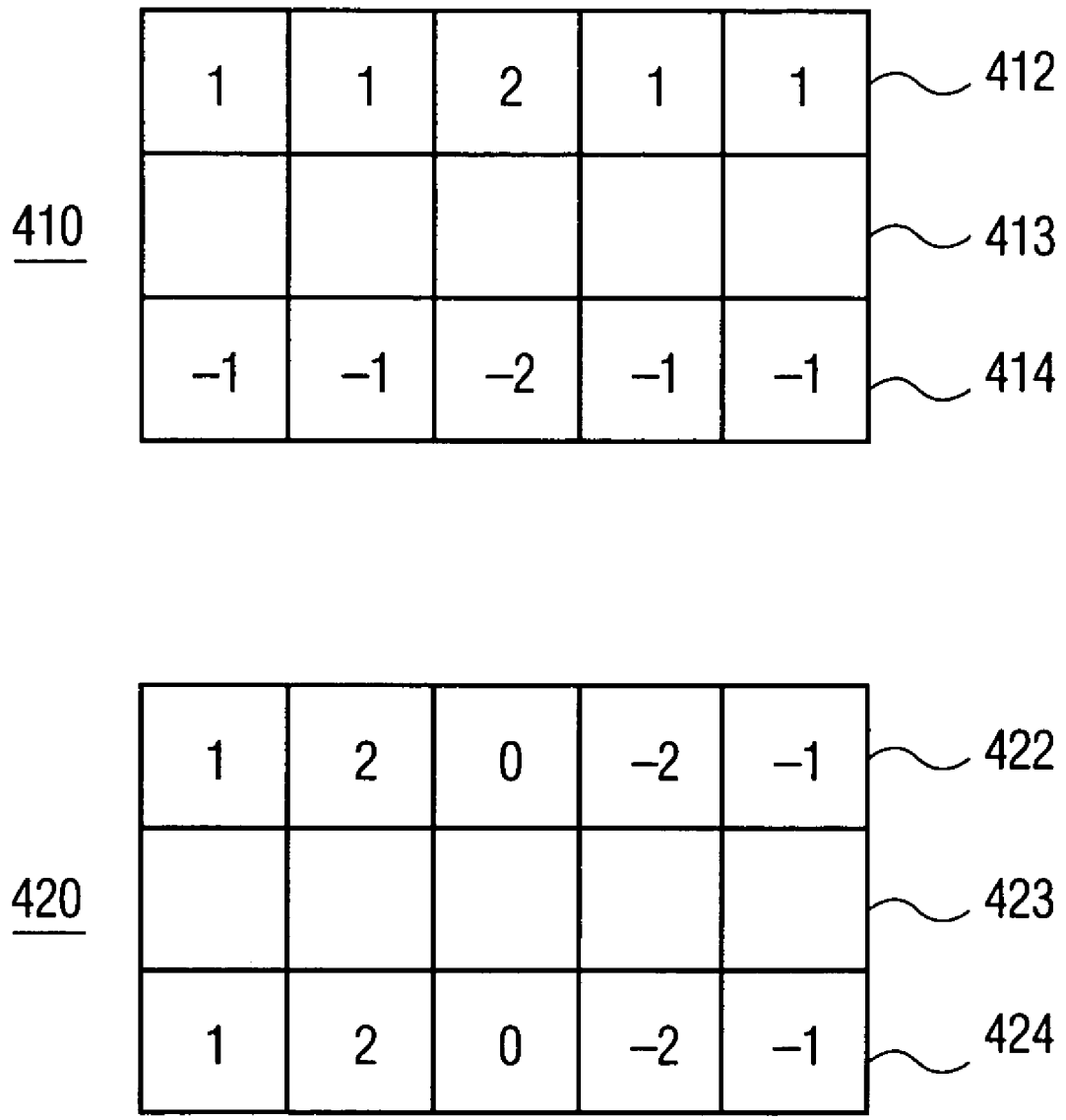
FIG. 4 is a data diagram that is useful for describing the edge detection filters utilized by the present invention.

As shown in FIG. 4, the exemplary horizontal edge detector 410 includes two finite impulse response (FIR) filters, 412 and 414. In the exemplary embodiment of the invention, each of these FIR filters is a five-tap filter having the coefficients shown in FIG. 4. Each of the filters multiplies five successive pixels on a line of the interlaced video signal by the respective coefficients and sums the results.

The two filters of the horizontal edge detector 410 operate on consecutive lines of one interlaced field. The output signal provided by the filter is an indication of the horizontal edge strength at the interpolated pixel position, the center position of the blocks 413.

In the same way, the vertical edge detector 420 employs two FIR filters 422 and 424 to generate an output signal representing the vertical edge strength for the interpolated pixel position, the center position of the blocks 423. The filters 422 and 424 also operate in parallel on the same lines of the interlaced image.

Figure 5:
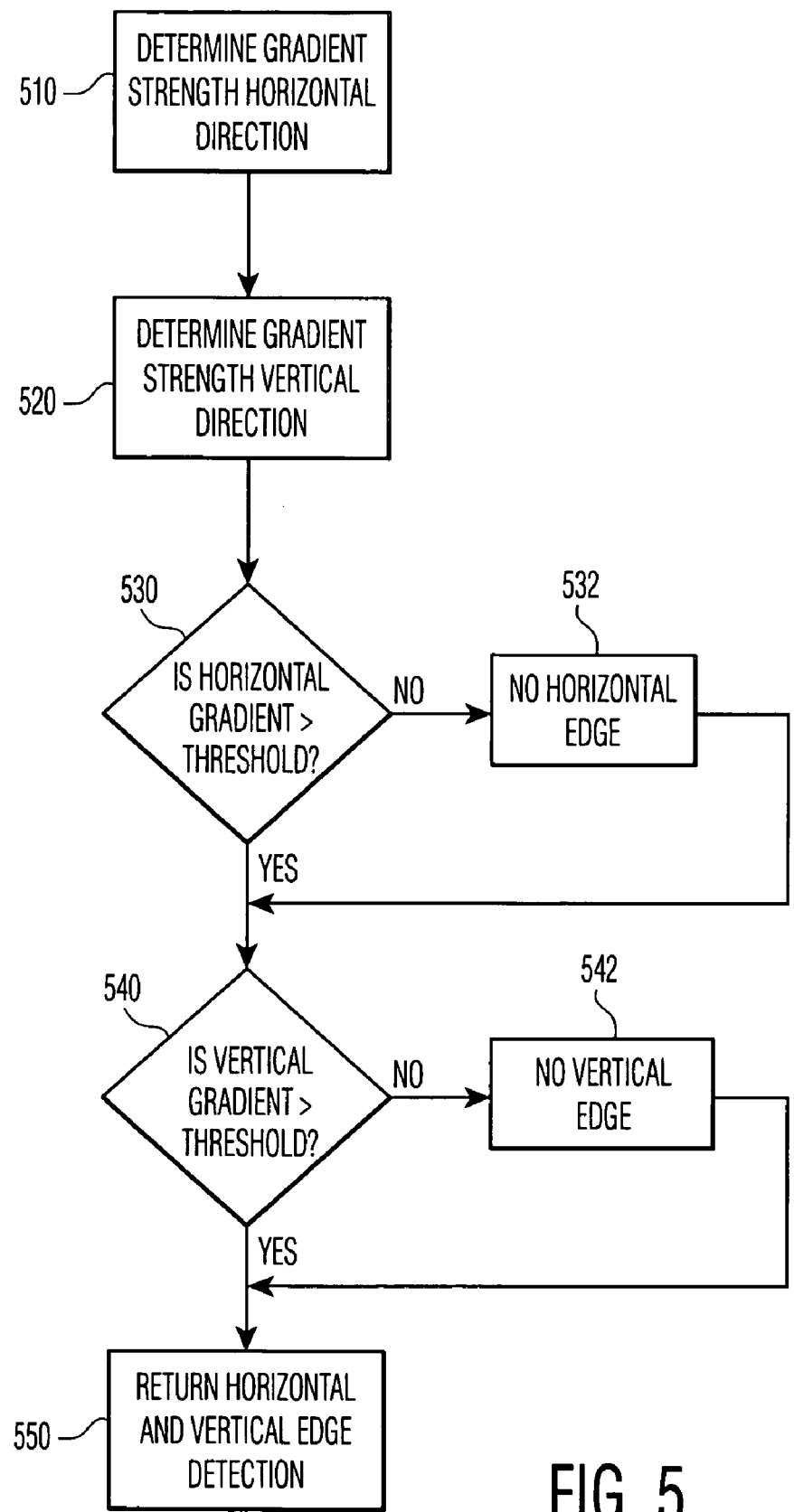
FIG. 5 is a flow diagram that illustrates the edge detection module of the present invention.

One exemplary method for detecting an edge is shown in FIG. 5. The edge detectors 410 and 420 return numeric values for the horizontal and vertical edges, as illustrated by blocks 510 and 520, respectively. If the values of the horizontal and vertical edges are greater than predetermined threshold values, blocks 530 and 540, then an abrupt change in intensity has been detected, and an edge is indicated. If the both values are less than the predetermined threshold values, then there is no change or a gradual change, and no edge is indicated, blocks 532 and 542.

Otherwise, if either the horizontal value or the vertical value exceeds its respective threshold value at step 550, edge detector 120 sets edge flag 125 (shown in FIG. 1), to indicate the presence of an edge in the image at the target pixel location.

Interpolation Methods

Figure 6:
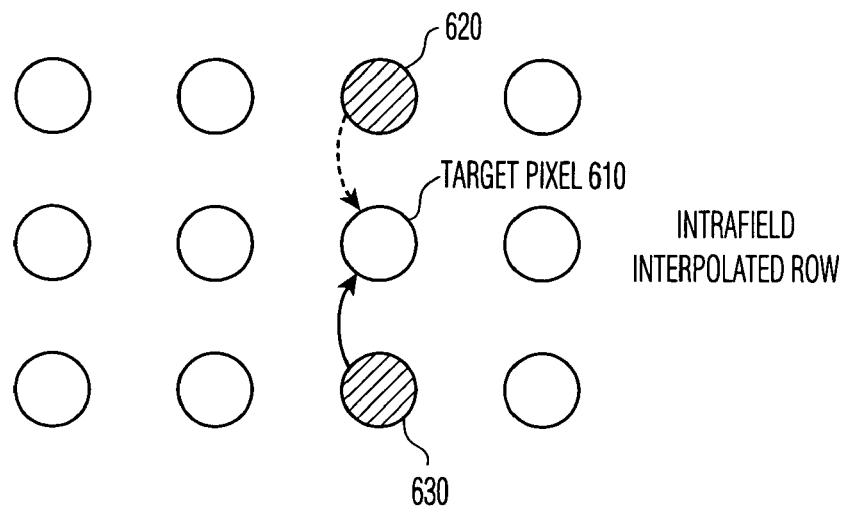
FIG. 6 is a pixel diagram that is useful for describing an intra-field interpolation method that may be used with the present invention.

One exemplary intra-field interpolation method that may be utilized by the present invention is described with reference to FIG. 6. Intra-field interpolator 130 operates, in the exemplary embodiment of the invention, by calculating a value for the target pixel 610 that is the average of the values of the pixels 620 and 630 vertically adjacent to the target pixel. The Intra-field interpolator, according to this example, is a simple 2 point bilinear interpolator that determines the value of the output pixel by equally weighing the pixels above and below the target pixel (i.e. filter coefficients are 0.5 and 0.5). Other methods of intra-field interpolation may be utilized, and the present invention is not limited to the method of intra-field interpolation described herein.

Figure 7:
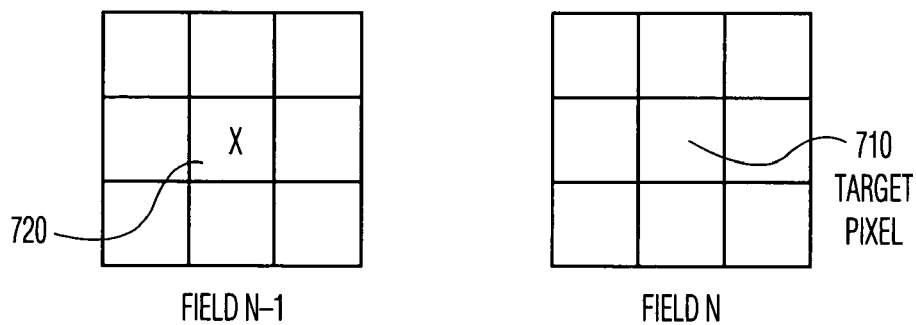
FIG. 7 is a data diagram that is useful for describing a field merge interpolation method that may be used by the present invention.

An exemplary field merge interpolation method that may be used by the present invention is described with reference to FIG. 7. In the Figure, Field N represents the scanned and interpolated rows for the present image, and Field N-1 represents the corresponding pixels from the previous field. The "X's" indicate active pixels in each field. Field merge interpolator 140 operates, in the exemplary embodiment of the present invention, by copying the pixel value 720 from the previous field as the target pixel 710 of the current frame. Other methods of field merge interpolation may be utilized, and the present invention is not limited to the method of field merge interpolation described herein.

Figure 8:
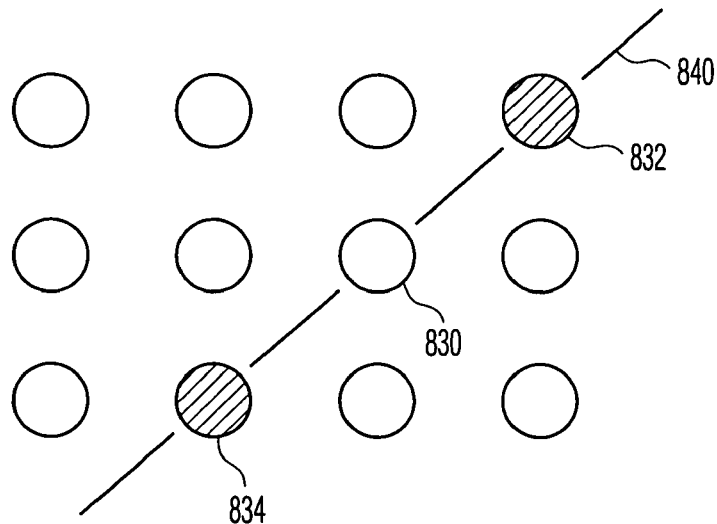
FIG. 8 is a pixel diagram that is useful for describing an edge-based interpolation method that may be used by the present invention.

FIG. 8 shows an exemplary edge based interpolation method that may be utilized by an exemplary embodiment of the present invention. Briefly, this exemplary edge based interpolation method operates by first calculating horizontal and vertical gradient edge strengths (see above explanation of edge detection in reference to FIGS. 4 and 5). If the horizontal and vertical gradient edge strengths exceed predetermined thresholds, then an edge is assumed to be present, and the horizontal and vertical edge strengths are used, to calculate the angle of the edge 840 passing through the target pixel 830. In the exemplary embodiment of the present invention, the values of the horizontal and vertical edge strengths are expressed as binary bit strings. The difference between the values of horizontal and vertical edge strengths is also stored as a binary bit string. The position of the most significant non-zero bit in the larger of the edge strengths is located. The corresponding position in the difference bit string is located, and the value at that position is divided by two. The values of a predetermined number of following bit positions are divided by ascending powers of 2 (i.e.; $2^2$, $2^3$, etc.) and summed. The resulting value is subtracted from 1.0. The inverse tangent function is applied to this value, to determine the angle of the edge 840 passing through the target pixel 830.

Because the angle is calculated by taking the difference between the larger of the horizontal and vertical edge for a single pixel position, the resulting angle may be less than 45°, greater than 45°, positive or negative. Whether the angle is greater than or less than 45° may be determined from which of the two gradient values is larger. If the horizontal gradient value is larger then the angle is less than 45°. It is more difficult to determine from the gradient values at one point whether the calculated angle is positive or negative. In the exemplary embodiment of the invention, this step is performed by the edge filters described below with reference to FIGS. 10A and 10B.

The value of the target pixel 830 generated by edge based interpolator 150 by applying an interpolation filter to the values of the pixels (e.g. 832 and 834) adjacent to the target pixel 830 and lying along the calculated edge 840 passing through the target pixel, values for edges having both positive and negative values are calculated by the edge based interpolator 150. One of these values may be selected, as described below, responsive to the edge filters shown in FIGS. 10A and 10B. Other methods of edge based interpolation may be utilized, and the present invention is not limited to the method of edge based interpolation described herein.

Figure 9E:
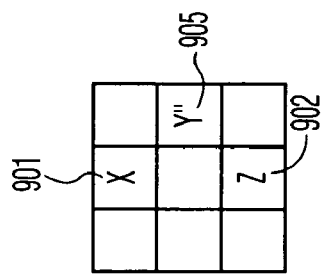
FIGS. 9A, 9B, 9C, 9D and 9E are pixel diagrams that are useful for describing a non-linear interpolation method that may be used by the present invention.
Figure 9D:
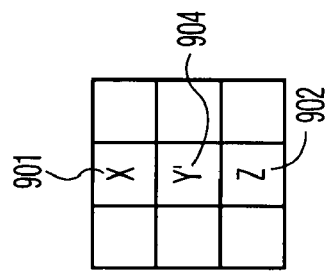
Figure 9C:
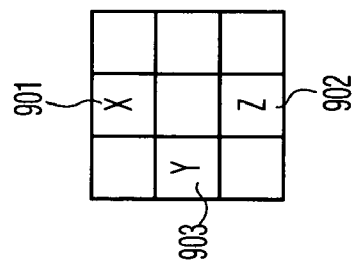
Figure 9B:
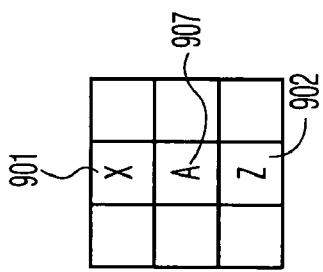
Figure 9A:
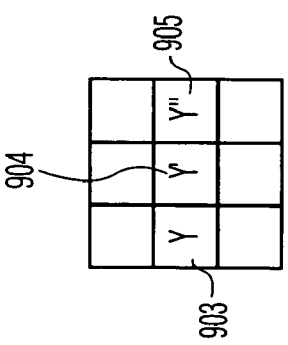

FIGS. 9A and 9B show a method of non-linear interpolation that may be utilized by the exemplary embodiment of the present invention. Field N represents the scanned rows of the current field that contain pixel values that are vertically and diagonally adjacent to the target pixel 907. The target pixel 907 is in an interpolated row of pixels. This row and other rows that are interstitial to the rows of field N are generated to convert field N of the interlace scan image into frame N of a progressive scan image. Field N-1 represents the rows and pixels of the previously displayed image field spatially corresponding to the rows and pixels of Field N. Non-linear interpolator 160 operates by comparing the value of the pixel 901 above the target pixel 907 and the value of the pixel 902 below the target pixel 907 with, respectively, the values of pixels 903, 904 and 905. Pixel 904 is spatially coincident with the target pixel 907 but in the previous frame and pixels 903 and 905 are horizontally adjacent to pixel 904.

Figure 9F:
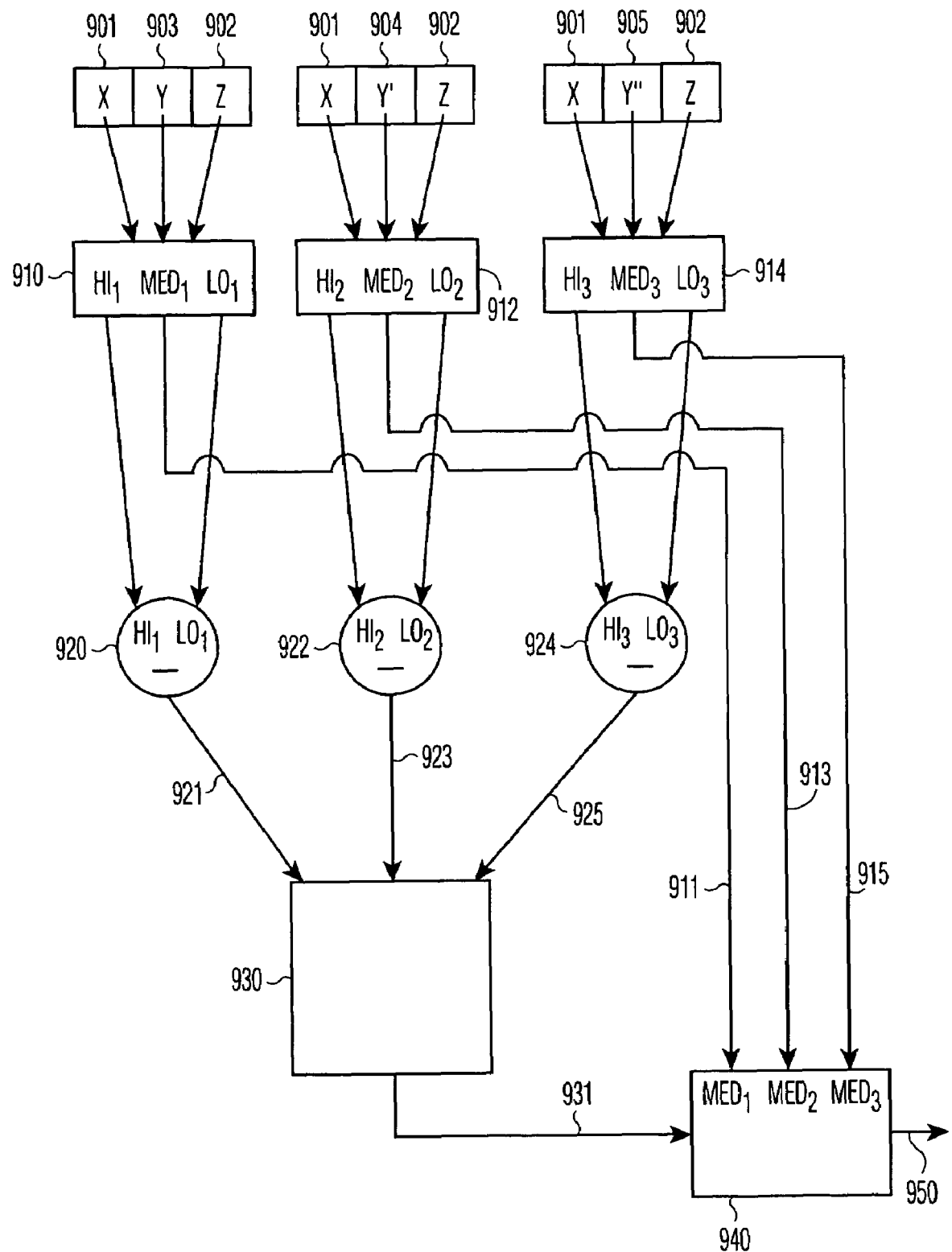
FIG. 9F is block diagram that is useful for describing the apparatus that implements the non-linear interpolation method described with reference to FIGS. 9A, 9B, 9C, 9D and 9E.

As shown in FIG. 9F, sorters 910, 912, and 914 receive respectively each set of pixel values ({901, 903, 902 }, {901, 904, 902 }, and {901, 905, 902 }) and send the highest and lowest values from each set to subtractors 920, 922, and 924. Subtractors 920, 922, and 924 each respectively subtracts the smaller value from the larger value and sends the result to selector 930. Selector 930 determines which subtractor 920, 922, and 924 has the smallest difference value 921, 923 or 925. Multiplexer 940 uses this value to select the corresponding median value 911, 913, and 915 of the original sets of pixel values. The selected median value is generated as the value 950 for the target pixel 907, shown in FIG. 9B.

Selection of the Target Pixel Value

As shown in FIG. 1, in block 170, the system generates a value for the target pixel, based on static level 115, edge detection flag 125, and the results of interpolation methods 130, 150, and 140 or 160, and also sets correction flag 175.

If edge detector flag 125 is set, the output of edge based interpolator 150 is selected as the value for the target pixel. Correction filter flag 175 is set to select an edge filter.

If edge detector flag 125 is not set and no movement is detected (e.g. static level 115 is zero), the output of the inter-field interpolator (i.e. field merge interpolator 140 or non-linear interpolator 160) is selected as the value for the target pixel. Correction filter flag 175 is set to select a non-edge filter.

If edge detector flag 125 is not set and large movement is detected (e.g. static level 115 is four), the output of intra-field interpolator is selected as the value for the target pixel. Correction filter flag 175 is set to select a non-edge filter.

In all other cases, (e.g. static level 115 is one, two or three) the results of the inter-field interpolator and the intra-field interpolator 130 are blended, as a function of static level 115, as shown in Table 2:

TABLE 2

| Static level | % Inter-field | % Intra-field |
|---|---|---|
| 0 | 100 | 0 |
| 1 | 75 | 25 |
| 2 | 50 | 50 |
| 3 | 25 | 75 |
| 4 | 0 | 100 |

The values generated by the inter-field interpolator and the intra-field interpolator 130, respectively, are multiplied by the percentage shown for the level of static level 115, and the results summed to generate a value for the target pixel. For example, the inter-field interpolator may have returned a value of 120, the intra-field interolator may have returned a value of 60, and the static level may be 3. Applying the above table, the calculation would be (120*25%)+(60*75%)=(30+45)=75, as the generated value for the target pixel. Correction filter flag 175 is set for a non-edge filter.

Correcting and Filtering of Final Result

Figures 10A, 10B:
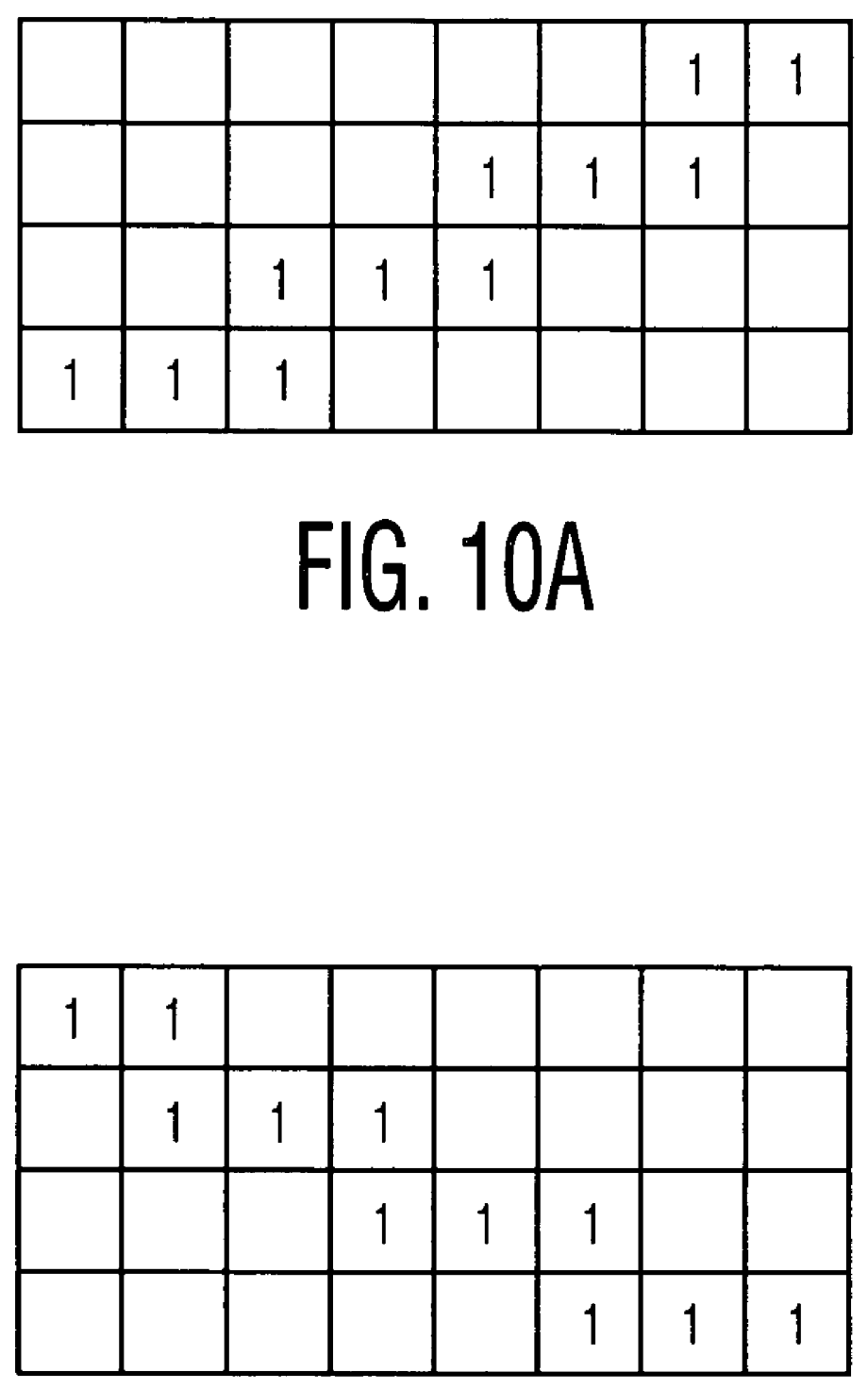

In block 180, the system selects and applies a filter, to ensure that the value for the target pixel is compatible with the surrounding pixels that make up the image to be displayed. If correction filter flag 175 is set for an edge based filter, then an edge filter according to the present invention is utilized. Exemplary edge filters are shown in FIGS. 10A and 10B. The exemplary filters are masks of at least two pre-selected angles, encopassing 3 or more rows (corresponding to at least the 2 interlace scan rows and the 1 interpolated row). One mask conforms to a positive edge angle and the other mask conforms to a negative edge angle. Each mask is the pixel pattern of a pre-selected angle across a predetermined number of rows. For example, FIG. 10A represents the edge mask over 4 rows for an angle approximating 45°, and FIG. 10B represents the edge mask over 4 rows for an angle approximating 315°. Each of the edge filters, shown in FIGS. 10A and 10B, may operate for example as a matched filter. If the image pixels or the edge map conforms to the edge filter a relatively large output value is produced. The amplitude of the output value varies with the match between the filter and the edge as represented in the edge map.

If the output value provided by at least one of the filters exceeds a threshold value (i.e., indicates an approximate match between the filter and the edge map at that pixel position), then the pixel is likely to be an actual edge pixel and one of the edge interpolated pixels, provided by the edge interpolator 150 (shown in FIG. 1) having the angle closest to the angle of the edge map (e.g. positive or negative) is selected. If no match is found among the edge filters, then it is likely that the pixel is not an edge pixel but an artifact of noise in the image. As described below, if the edge filters determine that the pixel is not an edge pixel then the output pixel provided by blending the results of the inter-field interpolator and intra-field interpolator is selected as the interpolated value for the target pixel.

Figure 11:
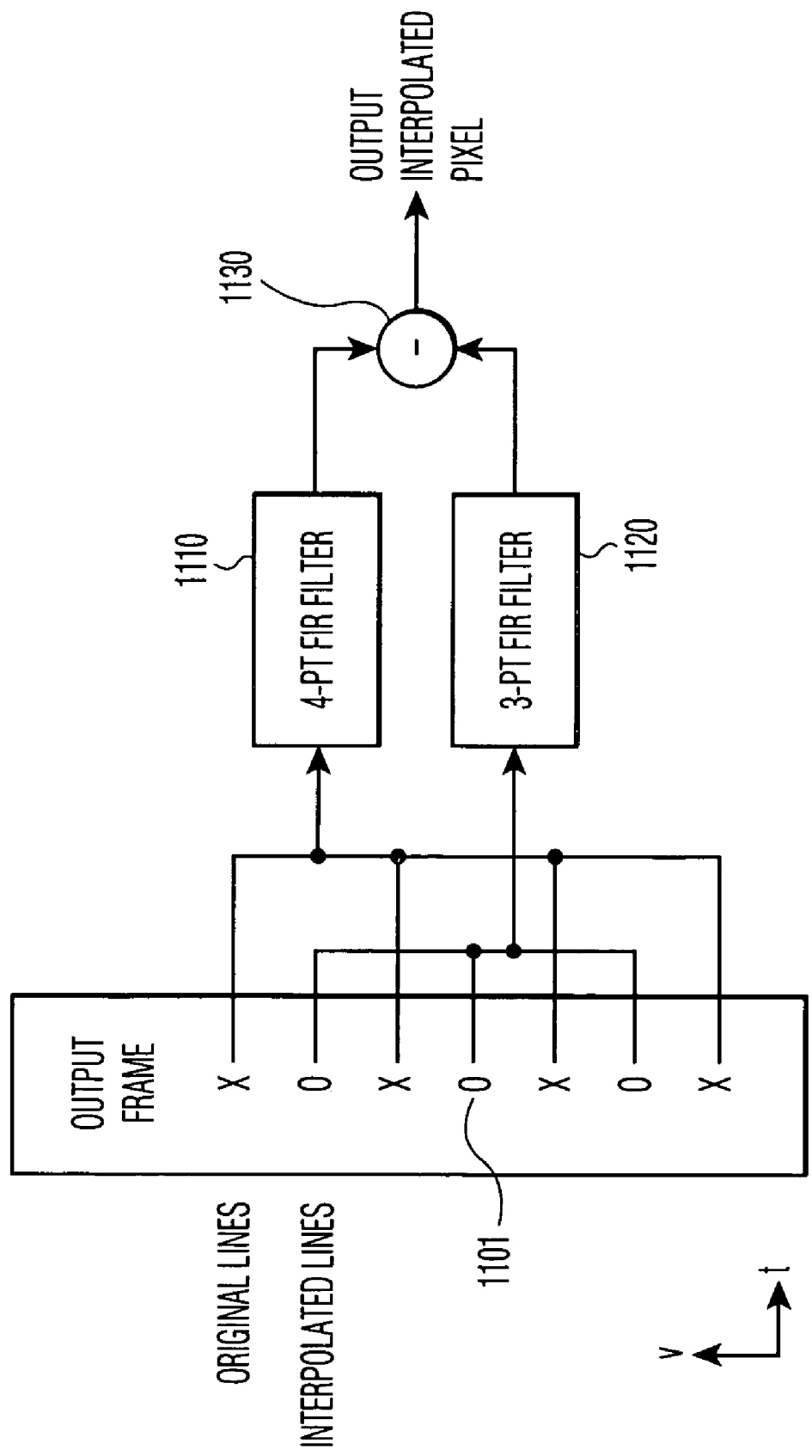
FIG. 11 is a block diagram of a correction filter suitable for use with the present invention.

If correction filter flag 175 is set for a non-edge filter, then a filter such as is shown in FIG. 11 is applied. The exemplary correction filter includes 2 finite impulse response (FIR) filters, 1110 and 1120. In the exemplary embodiment of the invention, the 4-point FIR filter 1110 may have, for example, coefficients of 0.08, 0.42, 0.42, and 0.08, and the 3-point FIR filter 1120 may have, for example, coefficients of 0.25, 0.5, and 0.25, respectively. The 3-point FIR filter 1120 multiplies the value of the target pixel and the values of the interpolated pixels above and below the target pixel by the 3-point FIR filter coefficients 1120, and sums the results. Similarly, the 4-point FIR filter 1110 multiplies the values of the two actual pixels above the target pixel 1101, and the two pixels immediately below the target pixel 1101 by the 4-point FIR filter coefficients 1110, and sums the results. The values generated by the 3-point FIR filter 1120 and the 4-point FIR filter 1110 are subtracted, and the result compared to a predetermined threshold. If the result exceeds the predetermined threshold value, then the difference is added to the intermediate value of the target pixel, to generate a final output value for the target pixel.

Method of the Present Invention

Figure 2B:
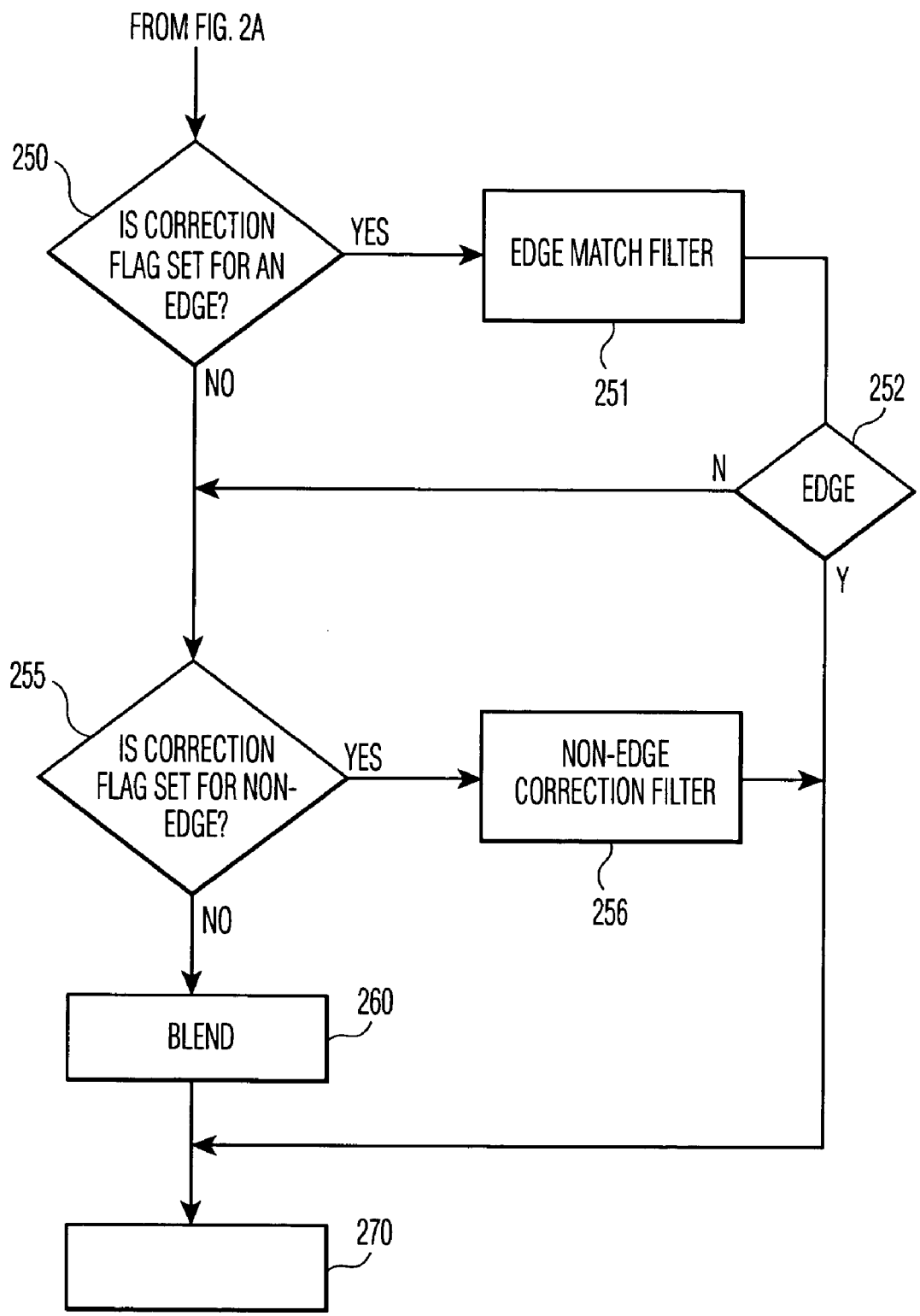
FIG. 2 is a flow diagram of a method of the present invention.

FIG. 2 shows a flow diagram of the steps of the exemplary method. The first stage determines whether a target is pixel is on an edge between two visually distinct regions, step 210, and also whether movement has occurred in the image to be displayed, step 220. This stage also generates several possible values for the target pixel from various interpolation methods, in step 230.

If, at step 240, the edge detector set an edge flag, then the intermediate value generated by the edge interpolator is selected for the target pixel at step 241. As explained above, if the edge flag is set, no other flag or intermediate result is evaluated.

In step 243, if the static level 115 (shown in FIG. 1) is zero, indicating no motion or fine motion, then the value from the inter-field interpolator is selected in step 244, and a correction flag is set to process the image using the non-edge correction filter at steps 255 and 256. This filter is described above with reference to FIG. 11. The correction flag is used to ensure that the detected fine movement is not the result of noise in the signal or other artifacts that might falsely indicate motion. If the static detector indicates rapid movement, step 246, then the value from the intra-field interpolator is selected in step 247, and a flag is set to invoke the blend with the inter-field interpolator at step 260, described below. The blend module is used to blend the results from the inter-field interpolator and the intra-field interpolator, depending on the degree of movement indicated by the value of the static level 115, as described above with reference to Table 2. As previously described, the static level 115 indicates motion from no movement to rapid movement across the image. If the static detector indicated no movement, then the value from the field merge interpolator is selected in step 249, and a flag is set to invoke the blend module.

If the target pixel lies on an edge, step 250, an edge filter may be applied in step 251, to determine if the target pixel may have been classified erroneously as an edge pixel due to noise in the image. The exemplary embodiment of the present invention uses the method disclosed in co-pending patent application titled METHOD OF EDGE-BASED INTERPO- LATION and filed on even date herewith. According to this co-pending patent application, and as explained above in reference to FIGS. 10A and 10B, pixel patterns of various predetermined angles are generated as masks. The pixel and its surrounding pixels are concurrently compared to all of the masks. If the pixels in the region of the target pixel in both the scanned and interlaced rows correspond to the edge mask within a predetermined level of tolerance, then the confidence that a correct edge is being generated is high.

If none of the edge filters produces a value that is greater than a threshold value, then the target pixel does not lie on an edge and step 251 sets a flag which causes the blend module, step 260, to be used to calculate the interpolated value for the pixel. In step 260, the values generated by the inter-field interpolator and the intra-field interpolator are weighted and blended according to the chart shown in Table 2, above. According to this method, the value of the target pixel is a function of the value it would have if it were totally static and if it were engaged in rapid movement, depending on the degree of movement expressed in the value of static level 115. By combining these two extreme values according to the degree of movement, the present invention eliminates the need to calculate intermediate values for varying levels of movement. After step 260 the process ends at step 270.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of converting an interlace scan video image to a progressive scan video image, comprising the steps of:
    (a) determining whether a target picture element (pixel) position of an interpolated row of pixels lies on an edge between visually distinct regions;
    (b) determining a degree of movement in the region of the target pixel position between a previously displayed image and the interlace scan image;
    (c) generating a plurality of potential values for an interpolated pixel at the target pixel position, including generating an intra-field interpolation value and a non-linear inter-field interpolation value;
    (d) selecting the intra-field interpolation value and the non-linear inter-field interpolation value from the plurality of potential values responsive to the determination of whether said target pixel position lies on an edge and the determined degree of movement in the region of the target pixel position;
    (e) filtering the interpolated pixel value to reduce errors in the interpolated pixel resulting from electrical noise in the interlace scan video image; and
    (f) blending the intra-field interpolation value and the non-linear inter-field interpolation value according to the degree of movement determined in step (b) to generate the value for the interpolated pixel.

2. A method according to claim 1 wherein
step (c) further includes the step of:
    generating an edge interpolation value; and
step (d) includes the step of selecting the edge interpolation value responsive to the determination that the target pixel position lies on an edge.

3. A method according to claim 2, wherein:
step (a) includes the steps of:
    generating a vertical edge strength value for the target pixel position;
    generating a horizontal edge strength value for the target pixel position;
    comparing the vertical edge strength value and the horizontal edge strength value to a threshold value; and
    determining that the target pixel position lies on an edge if at least one of the horizontal edge strength value and the vertical edge strength value exceeds a predetermined threshold value; and
the step of generating an edge interpolation value includes the steps of:
    determining an angle of the edge responsive to the vertical edge strength value and the horizontal edge strength value; and
    generating the edge interpolation value responsive to pixels in the interlace scan image that lie along the determined angle.

4. A method according to claim 1, wherein the step of generating an inter-field interpolation value includes the step of generating a field-merge interpolation value.

5. A method according to claim 1, wherein the step of determining a degree of movement in the region of the target pixel position between a previously displayed image and the interlace scan image includes the steps of:
    selecting a plurality of corresponding pixel positions in the region of the interlace scan image and in a corresponding region of the previously displayed image;
    generating a respective plurality difference values, each representing a difference between one of the selected pixel positions in the interlace scan image and the respective corresponding pixel position in the previously displayed image;
    determining a maximum difference value of the plurality of difference values; and
    comparing the maximum difference value to multiple respectively different threshold values to determine the degree of movement in the region of the target pixel position.

6. A method according to claim 1, wherein the step of filtering the interpolated pixel includes the steps of:
    if the target pixel position is determined to lie on an edge between visually distinct regions, comparing the interpolated pixel and other pixels in the interlace scan image to a plurality of edge masks to generate a respective plurality of correlation values; and
    if none of the plurality of correlation values exceeds a predetermined threshold value, calculating a new value for the interpolated pixel.

7. A method according to claim 6, wherein:
step (c) includes the steps of:
    generating an edge interpolation value;
    generating a non-linear interpolation value; and
    generating an inter-field interpolation value; and
the step of calculating a new value for the interpolated pixel includes the step of blending the non-linear interpolation value and the inter-field interpolation value according to the degree of movement determined in step (b) to generate the new value for the interpolated pixel.

8. A method according to claim 7, wherein the step of generating an inter-field interpolation value includes the step of generating a field-merge interpolation value.

9. A method according to claim 7, wherein the step of generating an inter-field interpolation value includes the step of generating a non-linear interpolation value.

10. A method of generating a non-linear interpolated pixel value for a target picture element (pixel) position between successive lines of an interlace scan video image, the video image including a plurality of successive fields, each pair of fields defining an image frame, the method including the steps of:
 determining respective minimum, maximum and median values for respective sets of pixel values, each set of pixel values including respective pixel values for pixel positions vertically adjacent to the target pixel position in the interlace scan image and the sets including respective pixel positions from a previous frame that include the target pixel position and pixel positions horizontally adjacent to the target pixel position;
 determining respective difference values between the maximum and minimum values for each set of pixel values; and
 selecting, as the non-linear interpolated value, the median value from the set having the difference value that is less than any other one of the difference values.

11. An interlace scan to progressive scan video signal conversion system, comprising:
 an edge detector that determines whether a target picture element (pixel) position of an interpolated row of pixels lies on an edge between visually distinct regions of a current image defined by the interlace scan video signal to provide an edge flag;
 a motion detector that determines a degree of movement in a further region of the current image containing the target pixel position between a previously displayed image and a current image to provide a static level value;
 a plurality of pixel interpolators which generate a plurality of potential values for an interpolated pixel at the target pixel position, including generating an intra-field interpolation value and a non-linear inter-field interpolation value, each potential value being generated by a respectively different method;
 a selector which selects the intra-field interpolation value and the non-linear inter-field interpolation value from the plurality of potential values responsive to the edge flag and the static level value;
 a weighted averaging circuit that blends the intra-field interpolation value and the non-linear inter-field interpolation value according to the degree of movement to generate the value for the interpolated pixel; and
 a filter which processes the interpolated pixel value to reduce errors in the interpolated pixel resulting from electrical noise in the interlace scan video image.

12. A system according to claim 11 wherein the plurality of pixel interpolators include:
 an edge interpolator;
 a inter-field interpolator; and
 an intra-field interpolator.

13. A system according to claim 12, wherein the inter-field interpolator is selected from a group consisting of a field merge interpolator and a non-linear interpolator.

14. A method according to claim 12, wherein:
 the edge detector includes:
  a vertical filter which generates a vertical edge strength value for the target pixel position;
  a horizontal filter which generates a horizontal edge strength value for the target pixel position;
  a comparator which compares the vertical edge strength value and the horizontal edge strength value to a threshold value and provides the edge flag if at least one of the horizontal edge strength value and the vertical edge strength value exceeds a predetermined threshold value; and the edge interpolator includes:
 a processor which combines the vertical edge strength value and the horizontal edge strength value to determine an angle of the edge; and
 an interpolator which processes pixel values from the interlaced field that lies on a line having an angle with respect to the target pixel position that conforms to the determined angle of the edge to generate the interpolated pixel value.

15. An interlace scan to progressive scan video signal conversion system according to claim 11, wherein the motion detector includes:
 a plurality of subtractors for generating a respective plurality difference values, each representing a difference between a selected pixel position in the current image and a respective corresponding pixel position in the previously displayed image;
 a maximum comparator which determines a maximum difference value of the plurality of difference values; and
 a plurality of further comparators which compare the maximum difference value to respectively different threshold values to determine the degree of movement in the region of the target pixel position wherein the static level value is provided responsive to the further comparators that have respective threshold values which are less than the maximum difference value.

16. A system according to claim 15, wherein the selector selects the intra-field interpolation value and the inter-field interpolation value and further includes a weighted averaging circuit which blends the intra-field interpolation value and the inter-field interpolation value in proportion to the static level value to generate the value for the interpolated pixel.

17. A system according to claim 11, wherein the filter includes:
 a plurality of correlators, each correlator comparing the interpolated pixel and other pixels in the interlace scan image to a respective edge mask to generate a respective plurality of correlation values;
 a comparator which compares each of the plurality of correlation values to a predetermined threshold value to sets a valid edge flag if at least one of the correlation values exceeds the predetermined threshold value; and
 a further interpolator which calculates a new value for the interpolated pixel if the valid edge flag is not set.

18. A method according to claim 17, wherein:
the plurality of pixel interpolators include:
 an edge interpolator which produces an edge interpolated value;
 an inter-field interpolator which produces an inter-field interpolated value; and
 an intra-field interpolator which produces an intra-field interpolation value; and
 the further interpolator includes a weighted averaging circuit that combines the intra-field interpolation value and the inter-field interpolation value in proportion to the static level value to generate the new value for the interpolated pixel.

19. An interlace scan to progressive scan video signal conversion system, comprising:
 an edge detector that determines whether a target picture element (pixel) position of an interpolated row of pixels lies on an edge between visually distinct regions of a current image defined by the interlace scan video signal to provide an edge flag;

a motion detector which determines a degree of movement in a region of a target pixel position between a last displayed image and a current image to generate a static level value;

an intra-field interpolator which generates an intra-field interpolated pixel value;

a non-linear inter-field interpolator which generates an non-linear inter-field interpolated pixel value; and a weighted averaging circuit that, responsive to the edge flag, combines the intra-field interpolated pixel value and the non-linear inter-field interpolated pixel value in proportion to the static level value to produce an output interpolated pixel value for the progressive scan video image.

20. An interlace scan to progressive scan video signal conversion system according to claim 19, wherein the motion detector includes:

a plurality of subtractors for generating a respective plurality difference values, each representing a difference between a selected pixel position in the current image and a respective corresponding pixel position in the last displayed image;

a maximum comparator which determines a maximum difference value of the plurality of difference values; and a plurality of further comparators which compare the maximum difference value to respectively different threshold values to determine the degree of movement in the region of the target pixel position wherein the static level value is provided responsive to the further comparators that have respective threshold values which are less than the maximum difference value.

21. A system according to claim 20, wherein the non-linear interpolator includes:

a plurality of median filters, each filter determining respective minimum, maximum and median values for respective sets of pixel values, each set of pixel values including respective pixel values for pixel positions vertically adjacent to the at get pixel position in the interlace scan image and the sets including respective pixel positions from a previous frame that include the target pixel position and pixel positions horizontally adjacent to the target pixel position;

a plurality of subtractors which determine respective difference values between the maximum and minimum values for each set of pixel values provided by the respective plurality of median filters; and a multiplexer that selects, as the non-linear interpolated value, the median value corresponding to the difference value that is less than any other one of the difference values.

22. A non-linear interpolator for converting an interlace-scan image to a progressive scan image, the interlace scan image including a plurality of successive fields wherein each pair of fields defines a frame, the non-linear interpolator generating an interpolated pixel value for a target pixel position, the target pixel position being vertically aligned between two pixel positions of the interlace scan image, the nonlinear interpolator comprising:

a plurality of median filters, each filter determining respective minimum, maximum and median values for respective sets of pixel values, each set of pixel values including respective pixel values for pixel positions vertically adjacent to the target pixel position in the interlace scan image and the sets including respective pixel positions from a previous frame that include the target pixel position and pixel positions horizontally adjacent to the target pixel position;

a plurality of subtractors which determine respective difference values between the maximum and minimum values for each set of pixel values provided by the respective plurality of median filters; and a multiplexer that selects, as the non-linear interpolated value, the median value corresponding to the difference value that is less than any other one of the difference values.

* * * * *